A. WIEMER.
CABINET TRAP.
APPLICATION FILED MAY 13, 1919.
1,349,177. Patented Aug. 10, 1920.
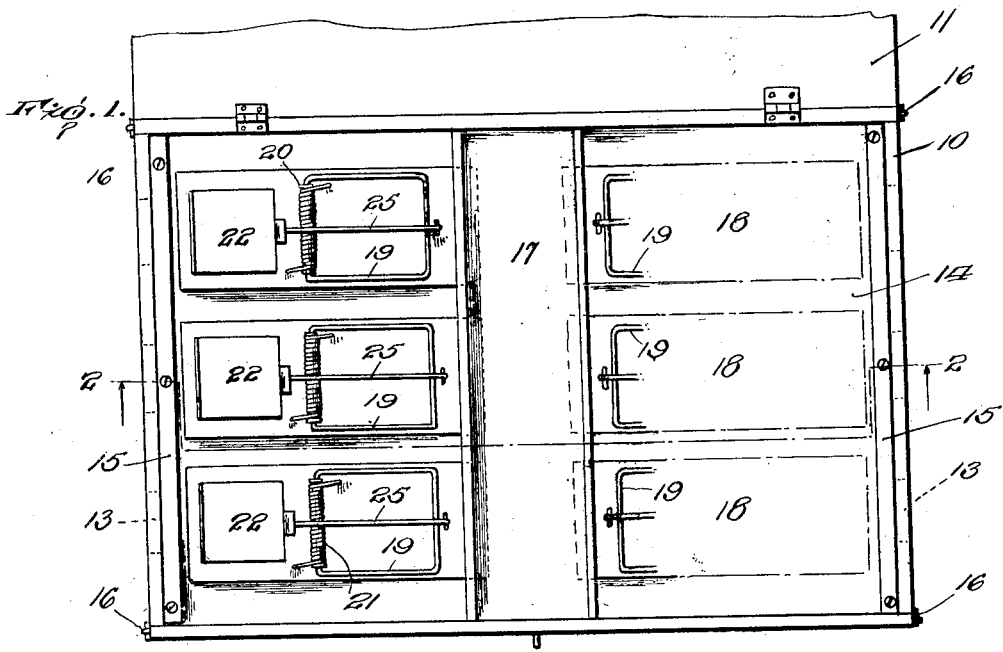
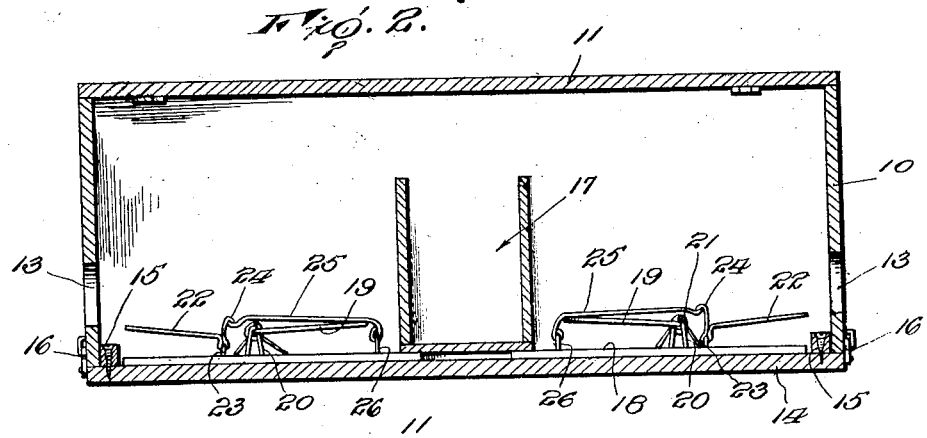
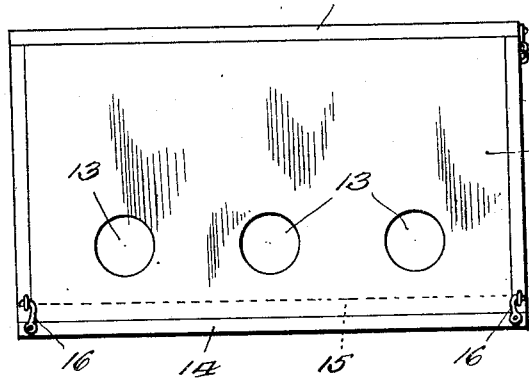
INVENTOR.
Albert Wiemer.
by Lacey & Lacey,
Attorneys.

UNITED STATES PATENT OFFICE.

ALBERT WIEMER, OF BRADLEY, ILLINOIS.

CABINET-TRAP.

1,349,177. Specification of Letters Patent. Patented Aug. 10, 1920.

Application filed May 13, 1919. Serial No. 296,848.

*To all whom it may concern:*

Be it known that I, ALBERT WIEMER, citizen of the United States, residing at Bradley, in the county of Kankakee and State of Illinois, have invented certain new and useful Improvements in Cabinet-Traps, of which the following is a specification.

This invention relates to an improved cabinet trap particularly designed for catching mice or rats and has as one of its principal objects to provide a construction wherein a plurality of traps will be housed within a box or cabinet ostensibly offering a place of safety and wherein the traps will be so arranged within the cabinet that an animal, upon entering the cabinet will more than likely be caught by one of the traps therein.

A further object of the invention is to provide a construction wherein by simply removing the bottom of the cabinet all of the traps may be displaced therefrom.

And the invention has as a still further object to provide a single bait trough for all of the traps so arranged with respect thereto that an animal entering the cabinet must pass over one or more of the traps in order to reach the trough and wherein the trough will also act to bind all of the traps in position within the cabinet.

Other and incidental objects will appear hereinafter. In the drawings:

Figure 1 is a plan view of my improved cabinet trap, the lid of the cabinet being open and being partly broken away, Fig. 2 is a longitudinal sectional view taken on the line 2—2 of Fig. 1 and looking in the direction of the arrows, and Fig. 3 is an end elevation of the device.

In carrying the invention into effect, I employ an oblong box or cabinet 10 which may be formed of wood or other approved material and is provided with a lid 11 normally held closed by a hook 12. Formed through each of the end walls of the cabinet is, as particularly shown in Fig. 3, a series of spaced openings 13, preferably three in number. The bottom wall 14 of the cabinet is removable. Secured to this bottom wall adjacent the ends thereof are transverse stop cleats 15 fitting within the cabinet to coact with the side and end walls thereof and swingingly connected with the bottom wall at its ends are hooks or other approved fastening devices 16 detachably securing the bottom wall in position. Rigidly fixed within the cabinet, at a point substantially midway of the ends thereof, is a transverse bait trough 17 the bottom wall of which lies in a plane slightly above the bottom wall 14 of the cabinet.

Arranged within the cabinet at each side of the trough 17 is a row of traps, preferably three in number, corresponding to the number of openings 13 in each of the end walls of the cabinet. The traps are carried by the bottom wall 14 of the cabinet and each of the traps is arranged to face one of the openings 13 opposite thereto. As will be observed, the traps each include a base 18 which may be formed from a flat strip of wood. Mounted to swing upon the base is a jaw 19 connected with the base by spaced staples 20. The jaw may be formed from a length of wire bent into proper shape and surrounding the inner transverse portion of the jaw between the staples 20 is a spring 21 tending to swing the jaw forwardly upon the base. Pivoted upon the base so as to lie within the jaw when the jaw is closed, is a trigger 22 swingingly supported by a staple 23 driven into the base. The trigger is preferably formed from a piece of suitable resilient sheet metal and, as particularly shown in Fig. 1, is provided with a wide tread at the inner end of which is formed a reduced portion bent into a loop to freely receive the staple and then continued upwardly to form a hook 24. Pivoted upon the base in the rear of the jaw is an arm 25 held by a staple 26 and, as will now be observed, the jaw may be moved to open position when the arm may be arranged to extend over the jaw and the hook 24 of the trigger engaged with the free end of the arm when the trap will be set.

As will now be seen, when all the traps are set, a mouse or rat entering any one of the openings 13 will, in attempting to reach bait within the trough 17, more than likely step upon the trigger of some one of the traps to be caught thereby and, in this connection, it will be observed that the likelihood of a catch will be materially increased by providing the traps with triggers having relatively large treads. In order to remove the traps, it will simply be necessary to disengage the hooks 16, when the bottom wall 14 of the cabinet may be displaced with all the traps thereon. In this connection, particular attention is directed to the fact that normally the bases 18 of all of the traps are engaged beneath the trough so that the trap bases are thus clamped between the bottom wall of the trough and the bottom wall of the cabinet body. Obviously, this arrangement provides a very convenient way of securing the traps fixed within the cabinet so that the traps will be maintained in proper spaced relation opposite the openings in the end walls of the cabinet and further so that the traps will not, when sprung, shift within the cabinet to interfere with each other.

As clearly illustrated in Fig. 1, the ends of the trough 17 are in contact with the adjacent sides of the casing, whereby accidental displacement of the trough is prevented as the result of any vibration of the traps upon being sprung. The contact between the ends of the trough and the adjacent sides of the casing rigidly secures the traps in position and prevents the same from partaking of any movement with relation to the other traps upon being sprung.

Having thus described the invention, what is claimed as new is:

1. A trap including a casing having side walls and a bottom, means to detachably secure the bottom to the casing, the opposite side walls of said casing being provided with spaced openings, a row of traps mounted on said bottom and arranged rearwardly of each set of openings in the side walls of the casing, the traps of each row having their rear ends arranged in opposed spaced relation to the traps of the other row, and a bait trough extending across the intermediate portion of the casing and having its ends rigidly secured to the opposite sides of the casing, the rows of traps having their rear end portions engaged by the bottom of said trough whereby the traps are securely held in position.

2. A trap including a casing having side walls and a bottom, means to detachably secure the bottom to the casing, the opposite side walls of said casing being provided with spaced openings, a row of traps arranged rearwardly of each set of openings in the side walls of the casing, and a bait trough arranged centrally within the casing and rearwardly of the forward ends of said traps, said trough having side walls extending upwardly from said rows of traps.

In testimony whereof I affix my signature.

ALBERT WIEMER. [L. S.]